No. 618,739.  C. H. SCHLAF.  Patented Jan. 31, 1899.
BACK PEDALING BRAKE.
(Application filed July 23, 1898.)
(No Model.)
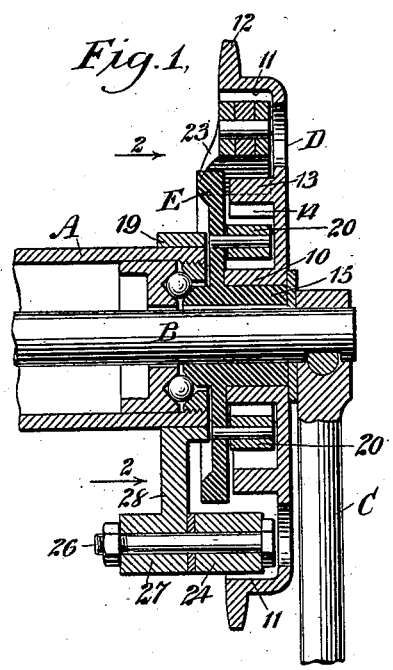
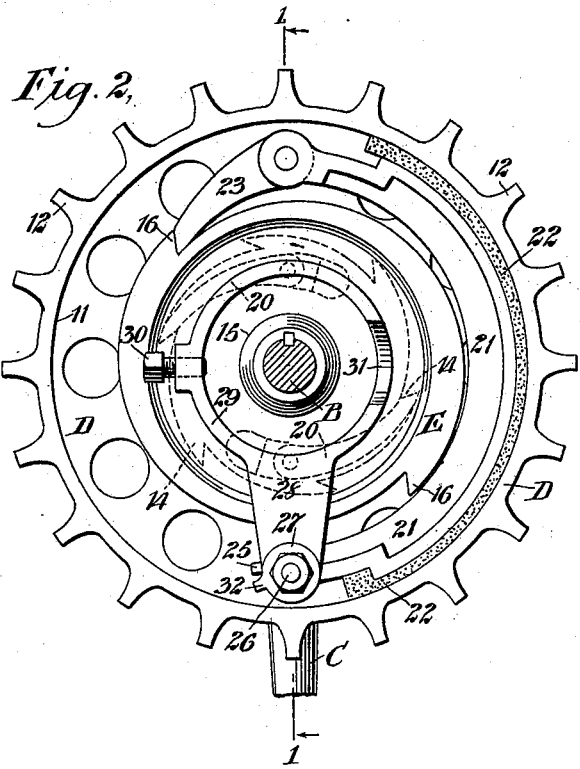
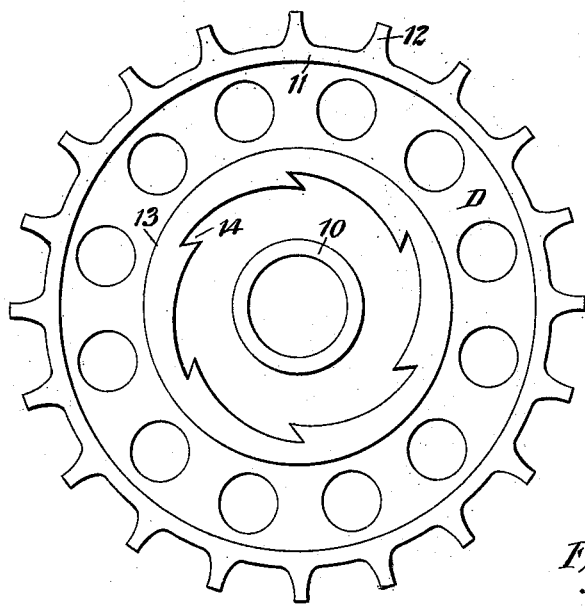
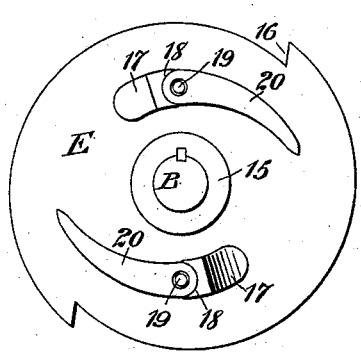
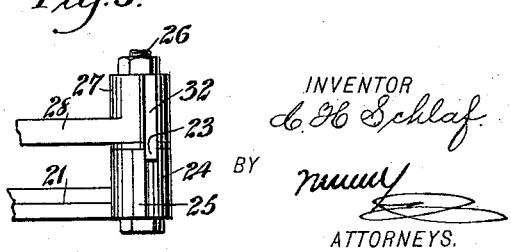
WITNESSES:
Edward Thorpe
INVENTOR
C. H. Schlaf.
BY
ATTORNEYS.
THE NORRIS PETERS CO., PHOTO-LITHO., WASHINGTON, D. C.

UNITED STATES PATENT OFFICE.

CHRISTIAN H. SCHLAF, OF SPRINGFIELD, MASSACHUSETTS, ASSIGNOR OF ONE-HALF TO HERBERT F. MUNN, OF NEW YORK, N. Y.

BACK-PEDALING BRAKE.

SPECIFICATION forming part of Letters Patent No. 618,739, dated January 31, 1899.

Application filed July 23, 1898. Serial No. 686,661. (No model.)

*To all whom it may concern:*

Be it known that I, CHRISTIAN H. SCHLAF, of Springfield, in the county of Hampden and State of Massachusetts, have invented a new and Improved Brake for Bicycles and Similar Machines, of which the following is a full, clear, and exact description.

The object of my invention is to provide a simple, durable, and economic form of brake adapted for convenient application to any style of bicycle, the brake being applied by back-pedaling, automatically releasing itself the moment the machine is propelled forwardly.

A further object of the invention is to provide for the support of the brake-shoe being attached directly to the crank-hanger and held stationary, and, furthermore, to provide a bearing for the brake-shoe against a surface of the driving-sprocket.

Another object of the invention is to place the driving-sprocket in such relation to the pedal-shaft or crank-shaft that when the pedals are manipulated to drive the machine dogs carried by the shaft will engage with the sprocket and rotate the same, but wherein when back-pedaling is resorted to the said dogs will cease to act upon the driving-sprockets, while the brake will be immediately brought into such contact with the driving-sprocket as to hold the sprocket stationary until a driving action is again in force, at which time the brake will be released.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a vertical section taken substantially on the line 1 1 of Fig. 2, showing the crank-hanger and bearings in section, likewise the driving-disk sprocket and brake-arm, the pedal-shaft being in elevation and likewise a portion of a pedal-crank. Fig. 2 is a transverse section through the pedal-shaft and an inner face view of the improved brake, as indicated by the arrows 2 2 in Fig. 1. Fig. 3 is an inner face view of the driving-sprocket detached from the machine. Fig. 4 is an outer face view of the driving-disk for the driving-sprocket; and Fig. 5 is a detail view of the pivotal connection of the brake-arm with its support, illustrating the means employed for limiting the movement of the said brake-arm.

A represents the crank-hanger of a bicycle-frame, together with its ball-bearings, B the crank shaft or axle journaled in the said hanger, and C one of the pedal-cranks attached to the said shaft.

D represents the driving-sprocket, which is provided with a hub 10 and a marginal inwardly-extending flange 11, upon which flange 11 the teeth 12 are formed. A ring 13 is formed upon the inner face of the driving-sprocket D around the hub 10, and in the inner peripheral surface of the said ring 13 teeth 14 are formed at intervals, the inclination of the said teeth being in a direction the reverse of the direction in which the said sprocket revolves when serving as a driver. This construction of the sprocket-wheel D is best shown in the detail view Fig. 3.

In connection with the driving-sprocket D a driving-disk E is employed. This disk is provided with a hub 15, and the disk is keyed or otherwise secured upon the pedal shaft or axle B, the hub of the driving-sprocket being mounted to turn loosely on the hub of the driving-disk, as shown in Fig. 1. Two or more teeth 16 are produced upon the peripheral surface of the driving-disk, the teeth being practically ratchet-teeth, since the peripheral surface of the disk extends from the outer edge of one tooth to the base of the opposing tooth, as shown best in Fig. 4. Lugs 17 are formed upon the outer face of the driving-disk at each side of the hub 15. These lugs are preferably diametrically opposite, as shown in Fig. 4, and in opposite faces of the said lugs cavities or sockets 18 are formed, the said sockets being usually segmental in contour, and in front of each socket of each lug a pin 19 is located. These pins 19 constitute the pivots of dogs 20, the dogs facing in opposite directions, as is also shown in Fig. 4, and the inner or pivotal ends of the dogs are rounded off or so shaped as to fit into the sockets 18 of the lugs 17. The dogs 20 on the driving-disk are adapted to engage with the interior or ratchet teeth 14, carried by the driving-sprocket D.

It is evident that when the dogs 20 are in driving connection with the driving-sprocket D the strain will not be sustained by the pivot-pins 19, since all of the strain will be maintained by the curved or socket faces 18 in the lugs 17, so that there is no possibility of the lugs being displaced or their pivots being broken under any condition of riding. The dogs 20 engage with the ratchet-teeth 14 of the driving-sprocket only when the pedal-shaft is revolved in a direction to propel the machine. Upon back-pedaling the dogs 20 simply slip past the teeth with which they engage when the machine is propelled forwardly.

The brake consists of a segmental arm 21, which is adapted to fit in between the periphery of the driving-disk and the inner face of the peripheral flange 11 of the driving-sprocket, as shown in Fig. 2. On the outer face of this brake-arm 21 a brake-shoe 22 is located, which brake-shoe is preferably of a yielding character, being constructed ordinarily of rubber, leather, or a similar material.

At one end of the brake-arm 21 a dog 23 is pivoted, the said dog being adapted to engage with the peripheral teeth 16 of the driving-disk when back-pedaling is resorted to; but while the machine is being forwardly propelled the dog 23 will slip past the teeth 16 and the arm will lie quite close to the periphery of the driving-disk, the brake-shoe 22 being out of contact with the flange of the driving-sprocket.

At the end of the brake-arm opposite that at which the dog 23 is pivoted a knuckle 24 is formed, provided with a longitudinal rib 25, and a pin 26 is passed through the knuckle 24 and a knuckle 27, which is formed upon a lug 28, the lug 28 forming a portion of a ring 29. The ring 29 is adapted to fit over the crank-hanger of the machine and is secured thereto by means of a set-screw or its equivalent, while the said ring is also provided with a recess 31, through which one of the members of the back fork of the frame may readily pass, the fork serving also to hold the ring 29 stationary. The knuckle 27, formed on the lug 28 of the ring 29, is provided with a longitudinal rib 32, which extends sufficiently below the lug to engage with the rib 25 on the knuckle 24. The two ribs 25 and 32 when they contact limit the inward movement of the brake-arm and prevent the said arm from being brought in frictional contact with the driving-disk E.

In the operation of the machine when the crank-shaft is operated in a manner to propel the machine the dog 23 of the brake-arm 21 is idle, while the dogs 20 of the driving-disk enter into such engagement with the internal teeth of the driving-sprocket to propel the said sprocket in a forwardly direction or in a direction to impart forward movement to the machine. The moment, however, that back-pedaling is resorted to the dogs 20 on the driving-disk are rendered idle, slipping past the teeth with which they are adapted to engage; but the rearward movement of the driving-disk will cause the dog 23 of the brake-arm to engage with one of the teeth 16 of the said disk, and said contact between the dog 23 and a tooth on the driving-disk will force the brake-arm 21 outward and carry the brake-shoe 22 in close engagement with the inner face of the flange of the driving-sprocket and prevent such sprocket from moving.

It will be observed that this brake is what may be termed a "hub-brake," is exceedingly simple, and is adapted for attachment to the frame of any bicycle or similar machine, and that the brake will be instantly applied upon back-pedaling and instantly released the moment that the machine is driven forward.

Having thus described my invention, I claim as new and desire to secure by Letters Patent—

1. In a bicycle or a like machine, the combination, with a crank-hanger, a pedal-shaft journaled in the said hanger, a driving-disk secured to the said pedal-shaft, which disk is provided with peripheral teeth, dogs pivoted at each side of its center, extending in opposite directions, and bearings for the said dogs independent of their pivots, of a driving-sprocket loosely mounted on the said shaft, the said driving-sprocket being provided with a peripheral flange and interiorly-located ratchet-teeth adapted to be engaged by the said dogs, a brake-arm provided with a brake-shoe located between the flange of the driving-sprocket and the periphery of the driving-disk, the shoe of the arm being adapted for engagement with the said flange, a dog carried by the said arm, adapted for engagement with the teeth of the driving-disk, a support to which the said brake-arm is pivotally connected, the said support being adapted for fixed engagement with the crank-hanger, the interior teeth of the driving-sprocket having an opposite inclination to the teeth on the driving-disk, and a stop device consisting of ribs located at the pivotal portion of the brake-arm and that portion of the support to which the said brake-arm is connected, the said ribs being adapted for engagement with each other at one position of the said brake-arm, for the purpose specified.

2. The combination of a crank-hanger, an axle mounted therein, a disk keyed to the axle and having ratchet-teeth, a driving-sprocket mounted loosely on the disk and having teeth, a pawl carried by the disk and adapted to engage the teeth of the driving-sprocket to move the sprocket, an arm rigid with the crank-hanger, a braking-arm mounted on the first-named arm and adapted to engage with the driving-sprocket to restrain the same, and a pawl carried by the braking-arm and adapted to engage with the ratchet-teeth of the disk to press the braking-arm outward.

3. The combination of a crank-hanger, a shaft mounted loosely therein, a disk having a hub keyed to the shaft and having ratchet-teeth on its periphery, a sprocket-wheel mounted loosely on the hub of the disk and having a ratcheted rim, and also having an inwardly-bent flange carrying the teeth of the sprocket, a pawl mounted on the disk and adapted to engage with the ratcheted rim of the sprocket, an arm fast to the crank-hanger, a braking-arm pivotally mounted on the first-named arm, stop-lugs for limiting the movement of the braking-arm, and a pawl mounted pivotally on the free end of the braking-arm and adapted to engage with the ratchet-teeth of the periphery of the disk, so as to push the braking-arm outwardly as the disk turns rearwardly.

4. The combination with a support, of a revolubly-mounted driving member, a disk turned with the member and having ratchet-teeth thereon, a sprocket-wheel mounted loosely relatively to the said driving member and disk and also having ratchet-teeth thereon, a pawl engaging between the disk and sprocket-wheel to drive the sprocket-wheel from the disk, a brake-arm mounted at one end to swing on the said support, and a pawl carried by the other end of the brake-arm and adapted to engage with the teeth of the disk.

CHRISTIAN H. SCHLAF.

Witnesses:
EVERARD BOLTON MARSHALL,
ALFRED LURCOTT.